US008610384B2

(12) United States Patent
Dommaschk et al.

(10) Patent No.: US 8,610,384 B2
(45) Date of Patent: Dec. 17, 2013

(54) CONVERTER WITH DISTRIBUTED BRAKE RESISTANCES

(75) Inventors: Mike Dommaschk, Moehrendorf (DE); Ingo Euler, Erlangen (DE); Herbert Gambach, Uttenreuth (DE); Joerg Lang, Stadtsteinach (DE); Quoc-Buu Tu, Rosstal (DE); Carsten Wittstock, Nuremberg (DE); Klaus Wurflinger, Nuremberg (DE); Andreas Zenkner, Obermichelbach (DE)

(73) Assignee: Siemens Aktiengesellschaft, Munich (DE)

( * ) Notice: Subject to any disclaimer, the term of this patent is extended or adjusted under 35 U.S.C. 154(b) by 49 days.

(21) Appl. No.: 13/061,622

(22) PCT Filed: Aug. 17, 2009

(86) PCT No.: PCT/EP2009/060627
§ 371 (c)(1),
(2), (4) Date: Mar. 1, 2011

(87) PCT Pub. No.: WO2010/023127
PCT Pub. Date: Mar. 4, 2010

(65) Prior Publication Data
US 2011/0163702 A1 Jul. 7, 2011

(30) Foreign Application Priority Data
Sep. 1, 2008 (DE) .......... 10 2008 045 247

(51) Int. Cl.
*H02P 3/14* (2006.01)
(52) U.S. Cl.
USPC .............................. 318/376; 318/87; 318/370
(58) Field of Classification Search
USPC ............... 318/375, 86, 87, 88, 370, 371, 744, 318/759, 376
See application file for complete search history.

(56) References Cited

U.S. PATENT DOCUMENTS

| | | | |
|---|---|---|---|
| 3,086,238 A * | 4/1963 | Baumhart | 15/250.12 |
| 5,254,816 A | 10/1993 | Shutoh et al. | |
| 6,803,734 B2 * | 10/2004 | Kumar et al. | 318/375 |
| 2008/0197966 A1 | 8/2008 | Sommer | |
| 2008/0232145 A1 | 9/2008 | Hiller et al. | |
| 2009/0045761 A1 | 2/2009 | Fuchs et al. | |

FOREIGN PATENT DOCUMENTS

| | | |
|---|---|---|
| DE | 3620926 C1 | 12/1987 |
| DE | 69202717 T2 | 10/1995 |

(Continued)

OTHER PUBLICATIONS

Machine translation of DE 3620926 C1.*

*Primary Examiner* — Lincoln Donovan
*Assistant Examiner* — Iftekhar Mustafa
(74) *Attorney, Agent, or Firm* — Laurence A. Greenberg; Werner H. Stemer; Ralph E. Locher

(57) ABSTRACT

A device converts electrical energy into heat in the field of drive voltage technology and/or high voltage technology. The device contains a brake resistance and at least one controllable brake power semiconductor for controlling the conversion, enabling a rapid and economical transformation of effective power into heat as required. To this end, the brake resistance contains a plurality of individual brake resistances that are each part of a bipolar submodule. The submodules are connected in series, form a submodule series connection, and at least partially contain an energy accumulator respectively connected in parallel to an associated individual brake resistance and a controllable brake power semiconductor, which allows the current flow over the respectively associated individual brake resistance in a brake position, and interrupts the current flow over the brake resistance in a normal operating position.

18 Claims, 5 Drawing Sheets

(56) References Cited

FOREIGN PATENT DOCUMENTS

| | | |
|---|---|---|
| DE | 19648948 C1 | 3/1998 |
| DE | 10103031 A1 | 7/2002 |
| DE | 102005040543 A1 | 3/2007 |
| DE | 102005040549 A1 | 3/2007 |
| DE | 102006010536 A1 | 9/2007 |
| EP | 0250719 A2 | 1/1988 |
| WO | 2007023061 A2 | 3/2007 |

* cited by examiner

CONVERTER WITH DISTRIBUTED BRAKE RESISTANCES

BACKGROUND OF THE INVENTION

Field of the Invention

The invention relates to an apparatus for conversion of electrical energy to heat in the field of drive and/or high-voltage technology by means of a braking resistance and at least one controllable braking power semiconductor for controlling the conversion.

By way of example, an apparatus such as this is already known from DE 10 2005 040 549 A1. The apparatus described there relates to a so-called multilevel converter, in which power semiconductor valves are connected between an AC voltage connection and a DC voltage connection. This results in a bridge circuit, which forms a positive and a negative DC voltage connection during normal operation. A series circuit of bipolar submodules extends between the positive and the negative DC voltage connections, and these bipolar submodules each have an energy store and a power semiconductor circuit. The power semiconductor circuit and the energy store are connected to the bipolar output of the submodule such that either the voltage dropped across the energy store or a zero voltage can be produced at the bipolar output of each submodule. A braking resistance is arranged in series with the series circuit of the submodules. The series circuit of the submodules and of the braking resistance is frequently also referred to as a braking controller. The positive and the negative DC voltage connections are connected via a DC voltage link circuit to a further converter which, for example, is operated as an inverter and is connected to an AC voltage power supply system or a polyphase motor. In the event of a fault, it is possible that the inverter may not be able to feed the real power produced on the DC voltage side into the connected AC voltage power supply system or polyphase motor. A situation such as this occurs, for example, during braking of the polyphase motor. The braking resistance is then used to convert the excess real power which occurs in a situation such as this to heat. This allows the converter, which is being operated as a rectifier, to still continue to operate as such, without this leading to total failure of the entire installation.

By way of example, FIGS. 1 to 4 show further apparatuses according to the prior art.

FIG. 1 shows three phase braking branches 1, which are connected on the AC voltage side to a converter. In this case, each phase braking branch 1 is conductively connected to an AC voltage connection of the converter. Furthermore, each phase braking branch 1 has a mechanical switch 2 and a braking resistance 3. At their end remote from the AC voltage connection, the phase braking branches 1 are connected to one another to form a common star point 4. By way of example, a mechanical circuit breaker, which is known per se, is used as the switch 2. When the circuit breaker 2 is switched on, current flows from the respective phase of the AC voltage connection via the braking resistance 3 to the common star point 4, with the electrical energy being converted to heat by the braking resistance.

FIG. 2 shows an exemplary embodiment as shown in FIG. 1, but with controllable power semiconductor valves 5 being chosen as the switches 2, and being connected back-to-back in parallel with one another. The power semiconductor valves 5 are, for example, thyristor valves, which cannot be turned off and are therefore externally commutated.

FIG. 3 shows a further exemplary embodiment according to the prior art. This figure also shows a converter 6 which has power semiconductor valves 7 which form a so-called six-pulse bridge circuit. Each power semiconductor valve 7 extends between an AC voltage connection 8 and a DC voltage connection 9 or 10. The DC voltage connections 9 and 10 are at different polarities during operation of the apparatus, and are therefore identified by a positive sign and a negative sign. A braking resistance 3 extends between the DC voltage connections 9 and 10, and is illustrated schematically here in the form of an inductance 11 and a non-reactive resistance 12. The braking resistance 3 is arranged on the DC voltage side of the converter 6, although the figure does not show a switch, which is arranged in series with the braking resistance, for connection of the braking resistance.

FIG. 4 shows an exemplary embodiment in which a series circuit 13 of power semiconductors which can be turned off and with freewheeling diodes connected back-to-back in parallel with them extends between the positive and the negative DC voltage connections 9 and 10 of a DC voltage link circuit. A braking resistance 3 is connected in series with the series circuit 13.

The apparatus of this generic type has the disadvantage that the time period between the activation of the braking controller and the effective conversion of real power to heat is too long to make it possible to reliably exclude faults on the converter.

BRIEF SUMMARY OF THE INVENTION

The object of the invention is therefore to provide an apparatus of the type mentioned initially, which allows real power to be converted quickly and at low cost to heat when required.

The invention achieves this object in that the braking resistance has a plurality of individual braking resistances which are each part of a bipolar submodule, wherein the submodules are connected in series, forming a submodule series circuit, and at least some have an energy store connected in parallel with a respectively associated individual braking resistance and a controllable braking power semiconductor which, in a braking position, allows the current to flow via the respectively associated individual braking resistance and, in a normal operating position, interrupts the current flow via this individual braking resistance.

According to the invention, a single braking resistance is not provided, as in the prior art, and instead of this the braking resistance is split into a multiplicity of individual resistances. In other words, the braking resistance consists of a plurality of individual resistances. In this case, the individual resistances are part of a bipolar submodule, with the two-pole submodules being connected in series with one another. In this case, the dimensions of the energy store and of the individual resistance are matched to one another so as to allow energy stored in the energy store during rated operation to be dissipated quickly. The controllable braking power semiconductor therefore allows real power to be converted quickly to heat. Once the braking power semiconductor has been triggered, the energy store is supplied with energy via the converter, which is operated as a rectifier, such that real power can be emitted as heat to the surrounding area even over relatively long time periods.

The apparatus according to the invention is expediently used in the field of drive technology and/or high-voltage technology, in particular in the field of electrical power transmission and distribution. The term "high voltage" covers all voltages above 1 kV.

The splitting of the total braking resistance into individual resistances also allows better cooling of the individual resistances. According to one preferred variant of the invention, cooling devices are therefore provided between the individual resistances, are thermally conductively connected to the individual resistances, and ensure rapid and reliable heat dissipation. By way of example, the cooling device comprises water cooling or air cooling.

The individual resistances are expediently in the form of a stack of resistance disks, with the resistance disks being composed of sintered materials. The flat faces of the resistance disks rest on one another within the stack, with a clamping apparatus providing the necessary contact pressure in order to ensure an area contact between the disk resistances.

A plurality of submodule series circuits are expediently formed which each at least partially form one of the power semiconductor valves of a converter. The power semiconductor valves of the converter each have an AC voltage connection and a DC voltage connection and are connected to one another, for example, in a six-pulse bridge circuit. The topology of the converter can in principle, be as required, as a result of which there is no need to describe this in detail at this point. According to this expedient further development of the invention, the individual resistances are at least part of the power semiconductor valves of the converter, and are therefore integrated in them. In this case, the power semiconductor valves consist of a series circuit of submodules, at least some of which comprise an individual braking resistance. According to one preferred refinement of the invention, each submodule comprises an individual braking resistance.

According to one further development, which is expedient to this purpose, each submodule has two power semiconductors which can be turned off, each of which has a freewheeling diode connected back-to-back in parallel with it. This results in a so-called half-bridge circuit. The power semiconductors are connected, in series, in parallel with the energy store and with the connecting terminals of the submodule such that either the voltage dropped across the energy store or else a zero voltage is dropped across the connecting terminals.

According to a further expedient refinement of the invention, two power semiconductors which can be turned off are provided for each submodule, with the two power semiconductors which can be turned off forming a power semiconductor series circuit, which is connected in parallel with a braking resistance series circuit, with the braking resistance series circuit in each case having an individual braking resistance and, in series with it, the braking power semiconductor, with the freewheeling diode connected back-to-back in parallel with it. The power semiconductor series circuit is connected to the connecting terminals of the submodule such that either a zero voltage can be produced at the connecting terminals of the submodule or the voltage dropped across the energy store, by expedient operation of the power semiconductor which can be turned off. This makes it possible to determine the voltage which is dropped between the DC voltage connection and the AC voltage connection of the power semiconductor valve. The energy stored in the associated energy store can be converted to heat as a function of the operation of the braking power semiconductor, by expedient operation of the braking power semiconductor. A so-called IGBT or GTO is expediently used as a braking power semiconductor which can be turned off. Power semiconductors which can be turned off can be turned on from an off position not only by a control pulse. In addition, the power semiconductors which can be turned off can be actively switched from the on position to the off position, that is to say in a controlled manner. By way of example, the braking power semiconductor can then be operated by expedient pulse-width modulation.

According to one further development, which is expedient to this purpose, a freewheeling diode is connected in parallel with each individual braking resistance. This allows the braking power semiconductor to be switched without any problems from an on position, in which current can flow via the braking power semiconductor, to an off position, in which current flow via the braking power semiconductor is interrupted. The turn-off current at the turn-off time of the braking power semiconductor via the individual braking resistance then flows via the freewheeling diode of the individual braking resistance.

Each submodule expediently comprises bridging means for bridging the submodule associated with the bridging means in the event of damage. In other words, the submodule is shorted in the event of a fault, such that failure of a single submodule does not make it necessary to turn off the entire power semiconductor valve.

According to one preferred refinement of the invention, the submodule series circuit or plurality of submodule series circuits can be connected between a positive DC voltage connection and a negative DC voltage connection of a converter. In other words, the submodule series circuit or circuits is or are designed, with the individual braking resistances, such that they can be arranged on the DC voltage side of a converter. By way of example, the converter is part of a high-voltage direct-current transmission installation, or of a frequency converter for an electrical machine.

According to one further development, which is expedient in this context, each energy store has a diode series circuit connected in parallel with it, in which diode series circuit at least two diodes are connected in series. According to this refinement, passive power semiconductors, specifically low-cost diodes, are chosen instead of the power semiconductors which can be turned off or can be controlled, which diodes allow current to flow in only one direction, but cannot be actively controlled. This reduces the costs of each submodule, whilst at the same time still allowing the energy store to be charged.

According to a further refinement of the invention, a braking resistance series circuit is connected in parallel with each energy store and each diode series circuit and has the individual braking resistance and, in series with it, the braking power semiconductor. As has already been described further above, this allows real power to be converted effectively to heat.

It is expedient for the number of series-connected submodules to be greater than 1, in particular greater than 3. The scalability of the conversion of electrical energy to heat is improved as the number of submodules fitted with an individual braking resistance increases. The energy can thus be dissipated specifically. It is particularly advantageous for the number of submodules with an individual braking resistance to be greater than 100.

A further aspect of the invention relates to an apparatus for conversion of an electric current or of an electrical voltage in the field of high-voltage technology, in particular in the field of electrical power transmission and/or distribution, wherein the apparatus has power semiconductor valves which are connected between an AC voltage connection and a DC voltage connection, wherein each AC voltage connection is connected to a phase braking branch, which has a series circuit formed by controllable power semiconductors and at least one braking resistance, wherein the phase braking branches are connected to one another, forming a delta or star circuit. According to this refinement of the invention, the apparatus comprises a converter and a braking controller. The braking controller is arranged on the AC side of the converter. This likewise allows real power to be converted at low cost and effectively to heat. The connection between the AC voltage connection and the phase braking branch is conductive.

Further expedient refinements and advantages of the invention are the subject matter of the following description of exemplary embodiments of the invention with reference to the figures in the drawing, in which the same reference symbols refer to the same figures, and in which

DESCRIPTION OF THE INVENTION

FIGS. 1 to 4 show braking controllers for apparatuses according to the prior art, as have already been referred to in the introductory part of this description, and which therefore do not need to be described in any more detail at this point.

Figure 1:
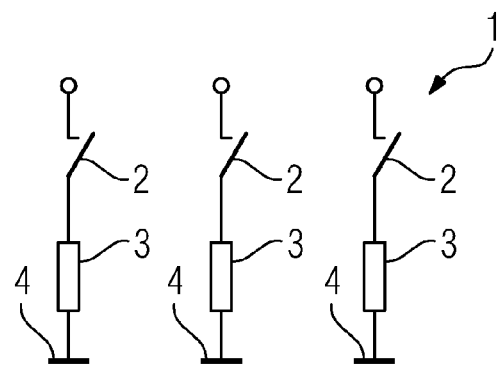
FIGS. 1 to 4 show apparatuses according to the prior art.
Figure 2:
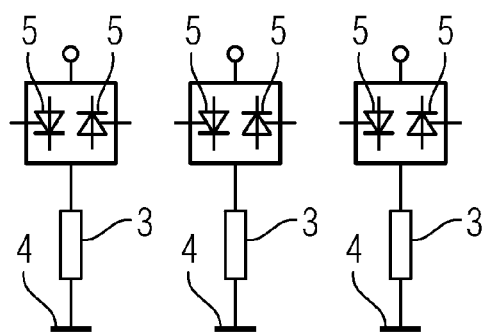
Figure 3:
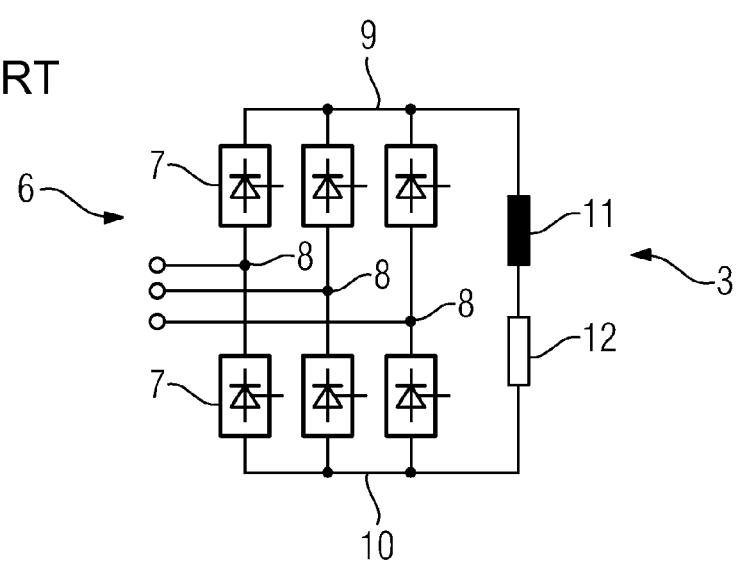
Figure 4:
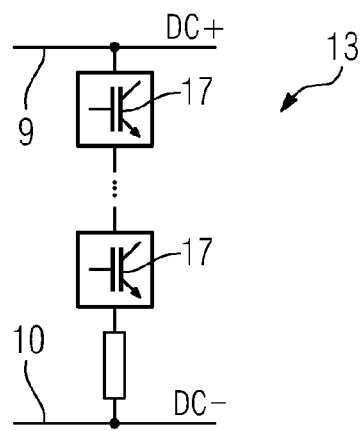
Figure 5:
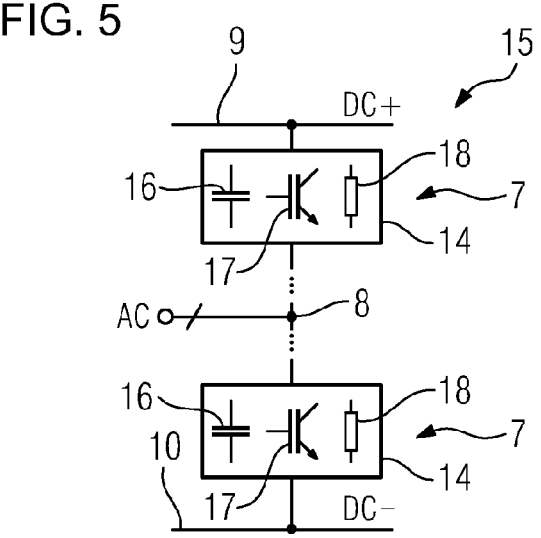
FIG. 5 shows a schematic illustration of one exemplary embodiment of the apparatus according to the invention.

FIG. 5 shows one exemplary embodiment of the apparatus 15 according to the invention. The apparatus 15 has power semiconductor valves 7 which each comprise a series circuit of bipolar submodules 14, with each of the power semiconductor valves 7 extending between an AC voltage connection 8 and a DC voltage connection 9 or 10. The apparatus 15 is intended for connection to an AC voltage power supply system, which is not shown in FIG. 5 but has a plurality of phases. A connecting means, for example a transformer, is provided for the link to the power supply system. For clarity reasons, FIG. 5 illustrates only one phase. However, the apparatus 15 according to the invention generally has a plurality of phases on the AC voltage side, for example three phases. FIG. 5 therefore shows only a portion of a six-pulse bridge circuit as shown in FIG. 3. The apparatus 15 has a total of six power semiconductor valves, or in this case submodule series circuits, however. However, a converter with one phase is also possible within the scope of the invention.

Each submodule has an energy store 16, at least one power semiconductor 17 which can be turned off and an individual braking resistance 18, whose connection will be described in more detail later.

Figure 6:
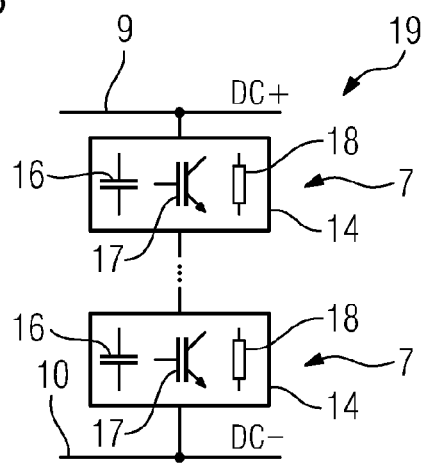
FIG. 6 shows a schematic illustration of a further exemplary embodiment of the apparatus.

FIG. 6 shows a further exemplary embodiment of the apparatus according to the invention, with FIG. 6 showing a submodule series circuit 19 which, as in FIG. 5, consists of a series circuit of bipolar submodules 14. In this case as well, each submodule has an energy store 16, at least one power semiconductor 17 and an individual braking resistance 18. However, the design of the submodules differs from the design of the submodules shown in FIG. 5.

Figure 7:
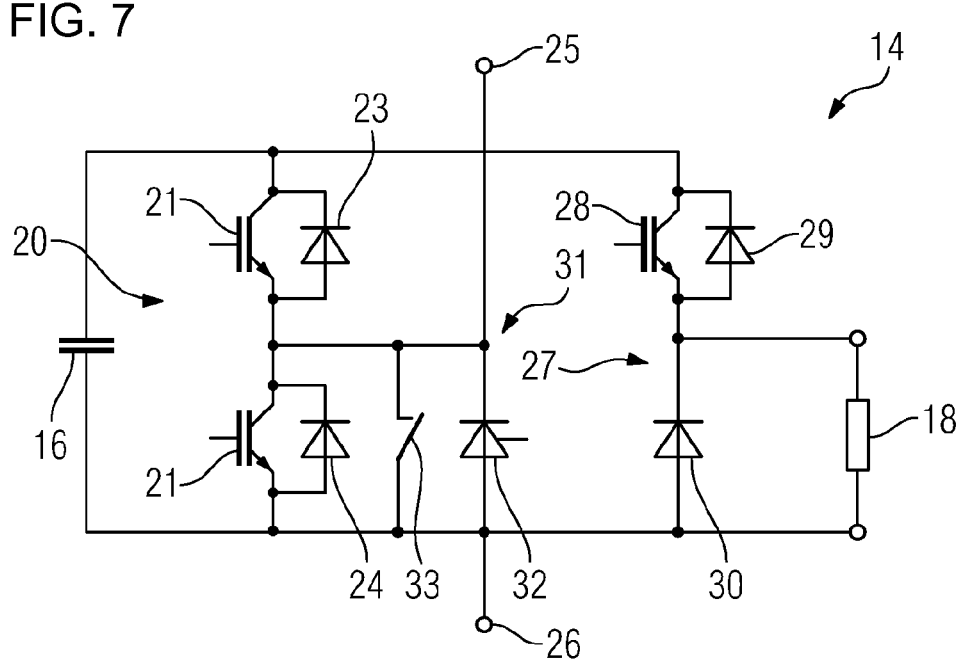
FIGS. 7 to 9 show exemplary embodiments of the design of submodules.

FIG. 7 illustrates the design of a submodule 14 as shown in FIG. 5. As can be seen, the energy store is a capacitor 16, with a power semiconductor series circuit 20 connected in parallel with it, which consists of two power semiconductors 21 and 22, which can be turned on and off, and freewheeling diodes 23 and 24 connected back-to-back in parallel with them. In this case, the junction point between the controllable power semiconductors 21 and 22 is at the same potential as one connecting terminal 25 of the submodule 14. The other connecting terminal 26 is in contrast connected directly to the junction point between the power semiconductor 22 and the energy store 16. By expedient operation of the power semiconductors 21 and 22, it is possible either to apply the voltages dropped across the capacitor 16 to the connecting terminal 25 and 26. In this case, the power semiconductor switch 22 is in its interrupter position while, in contrast, the power semiconductor 21 is in its switched-on position. When the power semiconductor 21 is in its interrupter position, but in contrast the power semiconductor 22 is in its switched-on position, a zero voltage is present at the output terminals 25 and 26. A braking resistance series circuit 27 is connected in parallel with the power semiconductor series circuit 20. The braking resistance series circuit 27 has a braking power semiconductor 28 which can be turned on and off, as well as a freewheeling diode 29 connected back-to-back in parallel with it. In series with the braking power semiconductor 28 which can be turned off, the braking resistance series circuit 27 has an individual braking resistance 18, likewise with a freewheeling diode 30 connected in parallel with it.

Bridging means 31 are used to bridge the submodule 14 in the event of a fault and, in the illustrated exemplary embodiment, consist of a controllable thyristor 32 and a switch 33 arranged in parallel with it. In the event of a fault, the thyristor 32, which is in the interrupter position during normal operation, is triggered, thus allowing the connecting terminals 25 and 26 to be rapidly shorted. This is done to reduce the load on the freewheeling diode, which is loaded with high short-circuit currents in the event of a short in the DC voltage link circuit. In the event of an overvoltage or a bridge short in the submodule, the switch 33 is closed in parallel with the triggering of the thyristor 32.

Figure 8:
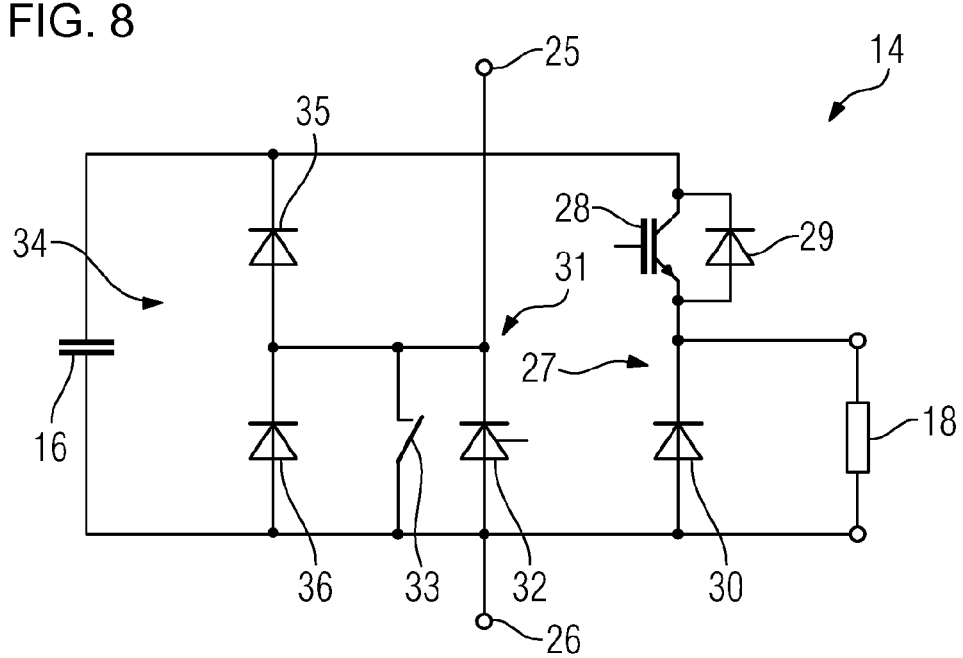

FIG. 8 shows one exemplary embodiment of a submodule 14 for an apparatus as shown in FIG. 6. In contrast to the exemplary embodiment of the submodule 14 as shown in FIG. 7, a diode series circuit 34 is provided instead of the series circuit 20 composed of controllable power semiconductors 21 and 22 as well as 23 and 24, which diode series circuit 34 consists of a first diode 35 and a second diode 36, which are connected in series in the sense of one another. Once again, the junction point between the diodes 35 and 36 is connected directly to the first connecting terminal 25, with the second connecting terminal 26 being at the same potential as one of the capacitor plates of the capacitor 16. As has already been explained in conjunction with FIG. 6, the connecting terminals 25 and 26 are part of a series circuit which extends between the positive DC voltage connection and the negative DC voltage connection of the converter. The unipolar relationships between the connecting terminals 25 and 26 ensure that the capacitor 16 is charged through the diode arrangement. If, in contrast, the aim is to check the real power and to convert it quickly to heat, the aim is to switch the braking power semiconductor 28, which can be turned on and off, from its interrupter position to its switched-on position, in which current can flow via the individual braking resistance 18. When the power semiconductor 28 is switched actively from its switched-on position to its switched-off position, a current flow is formed via the individual braking resistance 18 and the freewheeling diode 30 connected in parallel with it.

Figure 9:
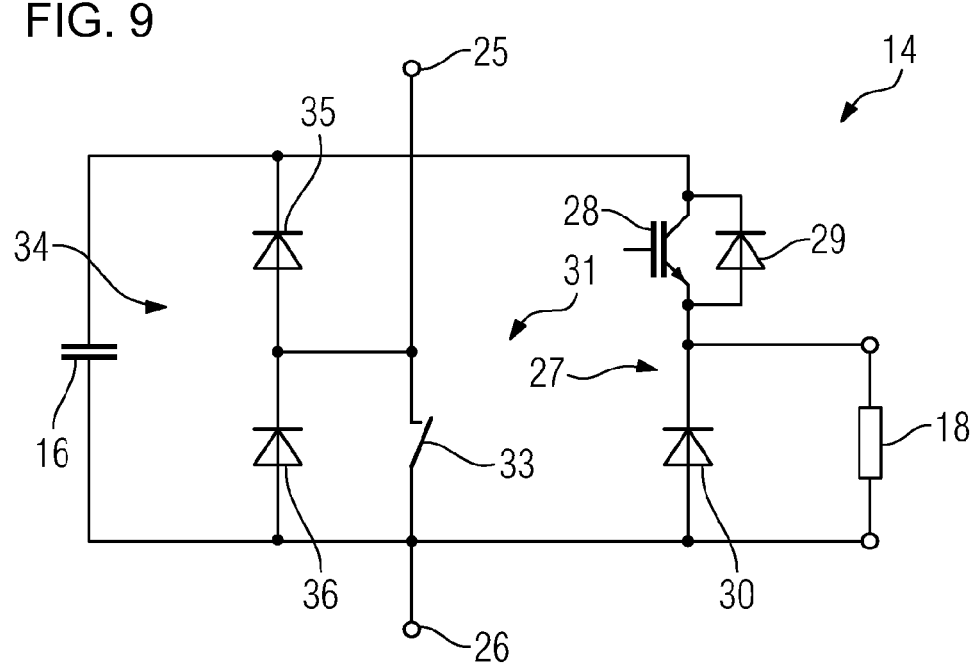

FIG. 9 shows a further exemplary embodiment of an apparatus as shown in FIG. 6 which differs from the exemplary embodiment of the submodule 14 as shown in FIG. 8 in that the bridging means 31 is provided simply by a mechanical switch 33. Apart from this, the statements relating to FIG. 8 apply in a corresponding manner here.

Figure 10:
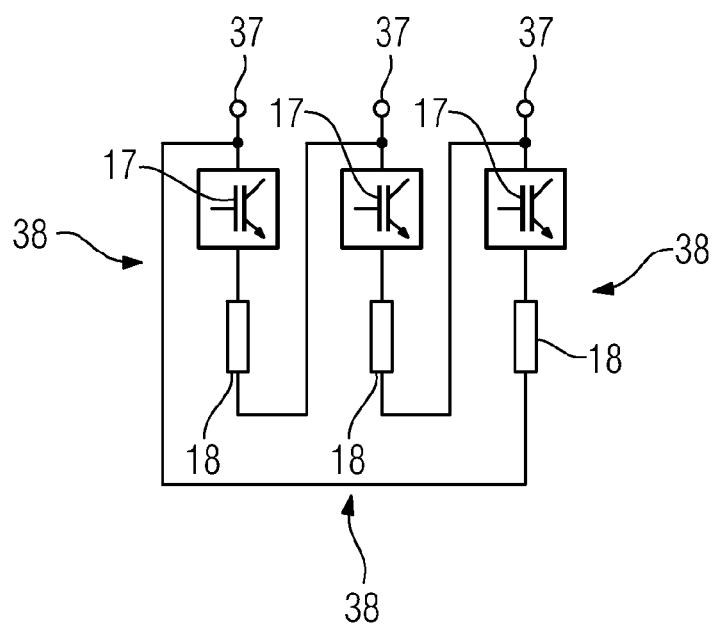
FIG. 10 shows a further exemplary embodiment of the apparatus according to the invention.

FIG. 10 shows a further exemplary embodiment of the invention, although the power semiconductor valves of the converter associated with the apparatus in this exemplary embodiment are not illustrated in the figure. In this case, the six power semiconductor valves, by way of example, in the converter have three AC voltage connections which are each connected to one AC voltage connection 37 of a phase braking branch 38, with each phase braking branch 38 having a series circuit of power semiconductors 17 which can be turned off and have a freewheeling diode connected back-to-back in parallel with them. Each phase braking branch 38 furthermore has an individual braking resistance 18, with the phase braking branches 38 being connected to one another in a delta circuit. However, a star circuit is also possible in this context.

Figure 11:
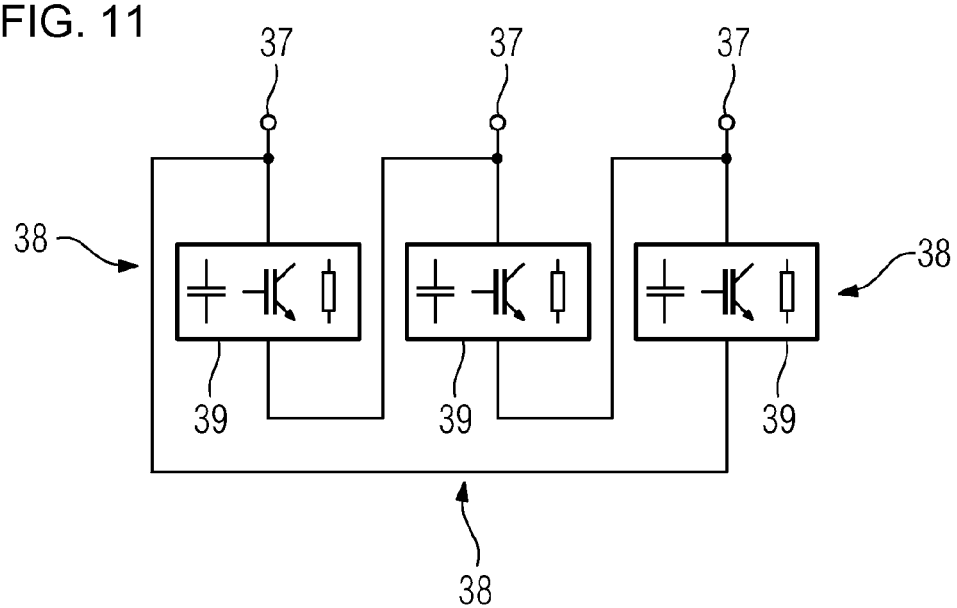
FIG. 11 shows a further exemplary embodiment of the apparatus according to the invention.
Figure 12:
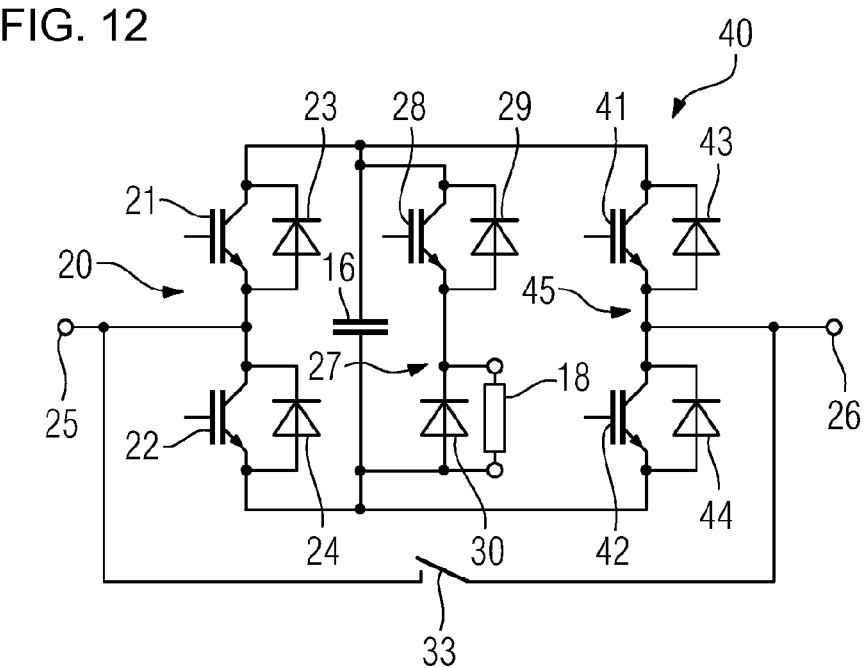
FIG. 12 shows a submodule of an apparatus as shown in FIG. 11.

FIG. 11 shows a further exemplary embodiment of the apparatus according to the invention, which is intended for connection to a three-phase power supply system, that is to say one with an AC voltage. The three AC voltage connections 37 are once again used for connection to the power supply system. According to this exemplary embodiment, there is no need whatsoever for the apparatus according to the invention to be arranged in the immediate vicinity of a converter. The apparatus shown in FIG. 11 can be operated independently of the converter. The apparatus shown in FIG. 11 has a series circuit of submodules 40, whose design is illustrated in FIG. 12. It should also be stated in conjunction with FIG. 11 that the phase modules 38, that is to say the series circuit 39 of the submodules, are connected to one another in a delta circuit.

FIG. 12 shows the design of the submodules 40 in more detail. In contrast to the submodule 40 illustrated in FIG. 7, the submodule 40 illustrated in FIG. 12 has a H-bridge or full-bridge circuit. In addition to the power semiconductors 21 and 22 which can be turned on and off and with freewheeling diodes 23 and 24 connected back-to-back in parallel with them, further power semiconductors 41 and 42 which can be turned on and off, likewise with freewheeling diodes 43 and 44 connected back-to-back in parallel with them, are therefore provided. The power semiconductors 41, 42 which can be turned off and the freewheeling diodes 43, 44 are once again arranged in a series circuit 45 which runs in parallel with the energy store, which in this case is once again in the form of a capacitor 16. The first connecting terminal 25 is conductively connected to the potential point between the power semiconductors 21 and 22 which can be turned off, while the second connecting terminal 26 is conductively connected to the potential point between the power semiconductors 41 and 42 which can be turned off. This makes it possible not only to drop the voltage which is dropped across the energy store 16 across the connecting terminals 25 and 26, but also to drop a zero voltage there, as is possible with a half-bridge circuit as shown in FIG. 7. According to FIG. 12, the inverse voltage of the energy store can also be produced at the connecting terminals 25 and 26. If the power semiconductors 21 and 42 are in their switched-on position, then the voltage which is dropped across the capacitor 16 is also dropped between the connecting terminals. However, if the power semiconductors 21 and 42 are in the switched-off position and the power semiconductors 41 and 22 which can be turned off are in contrast in their switched-on position, then the voltage which is dropped across the capacitor 16 is, however, present between the connecting terminals 25 and 26, but with a different mathematical sign.

Once again, the submodule 40 also has a braking resistance series circuit 27, which once again comprises the power semiconductor 28, which can be turned on and off, and a freewheeling diode 29 connected back-to-back in parallel with it. A freewheeling diode 30 is once again connected in parallel with the individual braking resistance 18. The energy stored in the capacitor 16 can therefore once again be converted to heat by means of the individual braking resistance 18, by operation of the power semiconductor 28 which can be turned on and off. The switch 33 is once again used to bridge the submodule 40, and therefore to short the connecting terminals 25 and 26. No further bridging means are shown here, for clarity reasons, although they are also possible within the scope of the invention.

The invention claimed is:

1. An apparatus for converting electrical energy to heat in a field of drive and/or high-voltage technology, the apparatus comprising:
a plurality of bipolar submodules connected in series forming a submodule series circuit, each of said bipolar submodules having first and second connecting terminals being switchable into a series connection, said bipolar submodules having a braking resistance formed of individual braking resistances, and at least some of said bipolar submodules having an energy store connected in parallel with a respective one of said individual braking resistances, said bipolar submodules each having a controllable braking power semiconductor for controlling a conversion and which, in a braking position, allows a current to flow via said respective individual braking resistance and, in a normal operating position, interrupts the current flow via said respective individual braking resistance, said individual braking resistances and said energy store connected between said first and second connecting terminals.

2. The apparatus according to claim 1, wherein a plurality of said submodule series circuits are formed each at least partially forming one of a power semiconductor valve of a converter.

3. The apparatus according to claim 2, wherein each of said submodules has two further controllable power semiconductors and two freewheeling diodes, each of said further controllable power semiconductors having one of said freewheeling diodes connected back-to-back in parallel with said further controllable power semiconductor.

4. The apparatus according to claim 1, wherein each of said submodules has bridging means for bridging said submodules to a return terminal in an event of a fault.

5. The apparatus according to claim 1, wherein said submodule series circuit can be connected between a positive DC voltage connection and a negative DC voltage connection of a converter.

6. The apparatus according to claim 1, further comprising cooling devices, each of said individual braking resistance is thermally conductively connected in each case to a respective one of said cooling devices and to an associated one of said cooling devices.

7. The apparatus according to claim 1, wherein a number of said submodules is greater than 1.

8. The apparatus according to claim 1, wherein each said respective individual braking resistance is a stack of resistance disks in a form of disks having flat faces, said resistance disks are composed of sintered materials and make an electrical pressure contact with one another on said flat faces.

9. An apparatus for converting electrical energy to heat in a field of drive and/or high-voltage technology, the apparatus comprising:
a plurality of bipolar submodules connected in series forming a submodule series circuit, said bipolar submodules having a braking resistance formed of individual braking resistances, and at least some of said bipolar submodules having an energy store connected in parallel with a respective one of said individual braking resistances, said bipolar submodules each having a controllable braking power semiconductor for controlling a conversion and which, in a braking position, allows a current to flow via said respective individual braking resistance and, in a normal operating position, interrupts the current flow via said respective individual braking resistance;

each of said submodules having two further controllable power semiconductors and two freewheeling diodes, each of said further controllable power semiconductors having one of said freewheeling diodes connected back-to-back in parallel with said further controllable power semiconductor;

each of said submodules having a braking resistance series circuit, said braking resistance series circuit having said controllable braking power semiconductor with a freewheeling diode connected back-to-back in parallel with said controllable braking power semiconductor and said controllable braking power semiconductor is connected in series with said respective individual braking resistance; and said two further controllable power semiconductors form a power semiconductor series circuit which is connected in parallel with said braking resistance series circuit.

10. The apparatus according to claim 9, wherein said submodules each contains a further freewheeling diode connected in parallel with said respective individual braking resistance.

11. The apparatus according to claim 9, wherein a plurality of said submodule series circuits are formed each at least partially forming one of a power semiconductor valve of a converter.

12. The apparatus according to claim 9, wherein each of said submodules has bridging means for bridging said submodules to a return terminal in an event of a fault.

13. The apparatus according to claim 9, wherein said submodule series circuit can be connected between a positive DC voltage connection and a negative DC voltage connection of a converter.

14. The apparatus according to claim 9, further comprising cooling devices, each of said individual braking resistance is thermally conductively connected in each case to a respective one of said cooling devices and to an associated one of said cooling devices.

15. The apparatus according to claim 9, wherein a number of said submodules is greater than 1.

16. The apparatus according to claim 9, wherein each said respective individual braking resistance is a stack of resistance disks in a form of disks having flat faces, said resistance disks are composed of sintered materials and make an electrical pressure contact with one another on said flat faces.

17. An apparatus for converting electrical energy to heat in a field of drive and/or high-voltage technology, the apparatus comprising:

a plurality of bipolar submodules connected in series forming a submodule series circuit, each of said bipolar submodules having first and second connecting terminals being switchable into a series connection, said bipolar submodules having a braking resistance formed of individual braking resistances, and at least some of said bipolar submodules having an energy store connected in parallel with a respective one of said individual braking resistances, said bipolar submodules each having a controllable braking power semiconductor for controlling a conversion and which, in a braking position, allows a current to flow via said respective individual braking resistance and, in a normal operating position, interrupts the current flow via said respective individual braking resistance, said individual braking resistances and said energy store connected between said first and second connecting terminals; and each said energy store has a diode series circuit connected in parallel with said energy store, said diode series circuit having at least two diodes connected in series.

18. The apparatus according to claim 17, wherein said submodules each has a braking resistance series circuit connected in parallel with each said energy store and each said diode series circuit, said braking resistance series circuit has said respective individual braking resistance and, in series with said braking resistance series circuit, said controllable braking power semiconductor.

* * * * *